United States Patent
Huang

(10) Patent No.: US 8,788,722 B2
(45) Date of Patent: Jul. 22, 2014

(54) METHOD AND ARRANGEMENT HANDLING PLUGGABLE MODULES AND OPERATING MODES IN A MEDIA CONVERTER SYSTEM

(75) Inventor: Wei-Ping Huang, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 248 days.

(21) Appl. No.: 13/379,886

(22) PCT Filed: Jun. 17, 2010

(86) PCT No.: PCT/SE2010/050680
§ 371 (c)(1),
(2), (4) Date: Jan. 11, 2012

(87) PCT Pub. No.: WO2011/002397
PCT Pub. Date: Jan. 6, 2011

(65) Prior Publication Data
US 2012/0102239 A1   Apr. 26, 2012

Related U.S. Application Data

(60) Provisional application No. 61/230,249, filed on Jul. 31, 2009, provisional application No. 61/221,781, filed on Jun. 30, 2009.

(51) Int. Cl.
*G06F 3/00* (2006.01)
*G06F 13/00* (2006.01)
*G06F 13/42* (2006.01)

(52) U.S. Cl.
USPC ....... 710/14; 710/1; 710/35; 710/46; 710/105

(58) Field of Classification Search
USPC .......................................... 710/14, 1, 35, 105
See application file for complete search history.

(56) References Cited

U.S. PATENT DOCUMENTS

| 6,839,872 B2 * | 1/2005 | Kohda ........................... 714/712 |
| 7,555,700 B2 * | 6/2009 | Takagi ........................... 714/774 |
| 8,085,809 B2 * | 12/2011 | Inoishi ........................... 370/466 |
| 2002/0118413 A1 * | 8/2002 | Yamada et al. ............... 359/118 |
| 2003/0021281 A1 * | 1/2003 | Tanaka et al. ................ 370/401 |
| 2004/0081465 A1 * | 4/2004 | Kim et al. ..................... 398/116 |
| 2005/0282413 A1 | 12/2005 | Israel et al. |
| 2006/0147178 A1 | 7/2006 | Ekkizogloy et al. |
| 2007/0019631 A1 * | 1/2007 | Jang .............................. 370/352 |
| 2007/0072451 A1 | 3/2007 | Tazawa et al. |

(Continued)

FOREIGN PATENT DOCUMENTS

| EP | 1287658 B1 * | 6/2001 | ............. H04L 29/60 |
| EP | 1287658 B1 * | 3/2003 | ............. H04L 29/06 |
| EP | 1720281 A1 | 11/2006 | |
| EP | 2495971 A1 * | 2/2012 | ............. H04N 7/20 |
| WO | 03049329 A1 | 6/2003 | |

*Primary Examiner* — Idriss N Alrobaye
*Assistant Examiner* — Gentente A Yimer
(74) *Attorney, Agent, or Firm* — Coats & Bennett, PLLC

(57) ABSTRACT

A method handling a pluggable module selectable from a plurality of pluggable modules is executable at a media converter system of a network configuration. The method provides for automatically enabling of a disabled channel or disabling of an enabled channel of the media converter system when the pluggable module is attached to the media converter system, wherein the suggested channel enabling/disabling feature is executed on the basis of a correlation between module specific information extracted from the respective pluggable module and corresponding information extracted via the media converter system. An arrangement for executing the suggested method is also provided.

24 Claims, 10 Drawing Sheets

(56) References Cited

U.S. PATENT DOCUMENTS

| | | |
|---|---|---|
| 2007/0100787 A1* | 5/2007 | Lim et al. .......................... 707/1 |
| 2008/0166131 A1 | 7/2008 | Hudgins et al. |
| 2008/0298378 A1* | 12/2008 | Shiba ............................ 370/401 |
| 2009/0268755 A1* | 10/2009 | Inoishi ........................ 370/466 |
| 2010/0023613 A1 | 1/2010 | Gao et al. |

* cited by examiner

| Protocol ID customization (Address A0h, bytes 3-10) |||
|---|---|---|
| Protocol/Transceiver type | Data byte 10 (hex value) | Data bytes 3-9 (hex value) |
| 10GBASE-SR | 10 | 00 |
| 10GBASE-LR | 11 | 00 |
| 10GBASE-ER | 12 | 00 |
| 10GBASE-LRM | 13 | 00 |
| 1000GBASE-SX | 20 | 00 |
| 1000GBASE-LX10 | 21 | 00 |
| 1000GBASE-LX40 | 22 | 00 |
| 1000GBASE-ZX | 23 | 00 |
| 1000GBASE-T | 24 | 00 |

Figure 5

| IEEE Vendor ID customization (Address A0h, bytes 37-39) ||||
|---|---|---|---|
| Byte 37 (hex value) | Byte 38 (hex value) | Byte 39 (hex value) | Vendor |
| 00 | 90 | 65 | FINISAR |
| 00 | 0B | 40 | OPNEXT |
| 00 | 00 | 5F | SUMITOMO |
| 00 | 17 | 6A | AVAGO |
| 00 | 18 | 23 | DELTA |

Figure 6

| Log-in ID customization (Address A2h, bytes 248-255) | | | |
|---|---|---|---|
| Bytes | Log-in ID | ASCII code (hex value) | ASCII code (binary value) |
| 248 | P | 50 | 01010000 |
| 249 | A | 41 | 01000001 |
| 250 | S | 53 | 01010011 |
| 251 | S | 53 | 01010011 |
| 252 | W | 57 | 01010111 |
| 253 | O | 4F | 01001111 |
| 254 | R | 52 | 01010010 |
| 255 | D | 44 | 01000100 |

Figure 7

| ID coding library |||||
|---|---|---|---|
| | ASCII code (hex value) | Vendor/s | Operating mode/s |
| Log-in ID | 50 | Apply to all | Apply to all |
| | 41 | Apply to all | Apply to all |
| | 53 | Apply to all | Apply to all |
| | 57 | Apply to all | Apply to all |
| | 4F | Apply to all | Apply to all |
| | 52 | Apply to all | Apply to all |
| | 44 | Apply to all | Apply to all |
| | | | |
| Vendor ID | 00-90-65 | FINISAR | Apply to all |
| | 00-0B-40 | OPNEXT | Apply to all |
| | 00-00-5F | SUMITOMO | Apply to all |
| | 00-17-6A | AVAGO | Apply to all |
| | 00-18-23 | DELTA | Apply to all |
| | | | |
| Protocol ID | 10 | Apply to all | 10GbE Limiting |
| | 11 | Apply to all | 10GbE Limiting |
| | 12 | Apply to all | 10GbE Limiting |
| | 13 | Apply to all | 10GbE Linear |
| | 20 | Apply to all | Forced 1GbE Bypass |
| | 21 | Apply to all | Forced 1GbE Bypass |
| | 22 | Apply to all | Forced 1GbE Bypass |
| | 23 | Apply to all | Forced 1GbE Bypass |
| | 24 | Apply to all | AutoNeg 1GbE Bypass |

Figure 8

METHOD AND ARRANGEMENT HANDLING PLUGGABLE MODULES AND OPERATING MODES IN A MEDIA CONVERTER SYSTEM

TECHNICAL FIELD

The present invention relates generally to a method and an apparatus for automatically handling pluggable modules and operating modes in a media converter system.

BACKGROUND

In recent years, Ethernet, and specifically 10 gigabit Ethernet, typically referred to as 10GbE has become one of, if not the most widely adopted technology to fulfill the demand of high data rate transmissions in data communication and/or telecommunication networks. One popular protocol used for 10GbE in data communication networks is the 10GBASE-CX4 that specifies the Physical layer (PHY) device for supporting 10 Gb/s over 4-lane copper cable (cf. IEEE802.3ak) similar to corresponding varieties used in InfiniBand™ and/or DensiShield™ technologies. The popularity of 10GBASE-CX4 protocol could be mainly attributed to the lowest per-port cost, the low power consumption and the low latency. On the other hand, however, 10GBASE-CX4 specifies a maximum working distance of 15 m only, which makes it difficultly to cover the basic demands of a telecom network, which is typically specified from a 200 m working distance for interconnecting applications up to a few tens of km working distance for long-haul applications. In order to reach a desired working distance, a 10GbE media converter system may be used for a 10GBASE-CX4 based host system in order to connect a remote link partner, or an IP transport network to an IP based host system. The media converter system typically converts a copper-based formatted signal, such as e.g. a 10GBASE-CX4 into fiber-optic based formatted signals, such as e.g. 10GBASE-SR/-IR/-ER specified by IEEE802.3ae or 10GBase-IRM specified by IEEE802.3aq.

A modern media converter system is designed to support fiber-optic based pluggable transceiver modules. Well-known pluggable transceiver modules for 10GbE applications include the various types known as e.g. XENPAK, XPAK, X2, XEP and SFP+. With the help of these modules, multiple protocols, such as e.g. 10GBASE-SR/-IR/-ER/-IRM, can be supported by the same media converter system, simply by exchanging the pluggable module attached to the media converter system.

Due to the similarity of mechanical construction of SFP+, the 10GbE media converter system may also be used to support SFP pluggable transceiver modules that run formatted signals with a lower data rate protocol for 1 gigabit Ethernet (1 GbE), such as e.g. 1000Base-SX/-IX/-ZX specified by IEEE802.3z and/or 1000base-T specified by IEEE802.3ab, respectively.

Because of numerous possible combinations between pluggable modules and operating modes, it is a time-consuming and tedious job for the operator to configure each individual channel for the purpose of setting up the 10GbE media converter system, particularly in case the system is made up by high dense channels using mixed types of pluggable modules. Thus, it is desired to obtain a process that can help an operator to speed up the procedures needed for the channel configuration of the 10GbE media converter system.

On the other hand however, after the installation of a 10GbE media converter system in a communication network, the operating mode for each individual channel is usually well-defined and has to be maintained during the life-time of its operation. In this case, the same type of module should always be used for each individual channel. Thus, it is also desired to come up with a solution that can help the operator to avoid mistakes, such as e.g. the mistake of plugging an incorrect type of module into the channel during an exchange of pluggable modules.

For the standardization of pluggable modules, Small Form Factor (SFF) Committee was formed in 1990 and SFP Transceiver Multi-Source Agreement (MSA) was filed in 2000, particularly for SFP+/SFP modules. According to MSA and SW, SFP/SFP+ modules should be provided with a built-in electrically erasable programmable read only memory (EE-PROM) that stores the information of sophisticated identification (ID), such as e.g. information on capability, the standard interface, and/or manufacturer information. In SW-8472, 2009 Jun. 30 MSA/SFF the recommended codes for protocol identities in the EEPROM map has been specified for both SFP+ pluggable modules, such as e.g. 10GBASE-SR/-IR/-ER/-IRM, and SFP pluggable modules, such as e.g. 1000Base SX/-IX/-ZX/-T, e.g. by selection of data address A0h with bytes 3 and 6 respectively. The protocol ID may also be referred to as the Transceiver type ID, according to the SFF-8472 recommendation. Nowadays, different SFP+/SFP vendors and/or suppliers mainly use their self-defined byte values for ID codes in the EEPROM to provide information for the protocols used by pluggable modules, which makes it more difficult for the host system vendor to interpret the extracted application ID codes used by the EEPROM, particularly in case of pluggable modules that are sourced by different vendors/suppliers.

Thus, there is a need in the art to develop arrangements and methods that can provide the means necessary for identifying various types of application ID extracted from the EEPROM of pluggable modules, to simplify and automate the procedures needed for handling various types of pluggable modules and operating modes used in a media converter system, and particularly in a 10GbE media converter system.

SUMMARY

The object of the present document is to address at least some of the problems addressed above. In particular, it is an object of the present document to provide a solution that can automatically handle a pluggable module when attached to a media conversion system.

According to one aspect, a method at a media converter system of a network configuration of handling a pluggable module selectable from a plurality of pluggable modules is provided. When the suggested method is executed at the media converter system a disabled channel will be automatically enabled or an enabled channel will be automatically disabled when a pluggable module is attached to the media converter system, wherein the mentioned channel enabling/disabling process is executed on the basis of a correlation between module specific information extracted from the respective pluggable module and corresponding information extracted via the media converter system.

The information extractable from the media converter system may comprise different types of identity codes, such as e.g. one or more protocol identity codes and an operating mode associated with each respective protocol identity code and/or one or more vendor identity codes, each of which is associated with a specific vendor, and/or one or more unique log-in identity codes.

More specifically the information extracted from the pluggable module typically comprises an application identity code associated with the channel, while the information extracted via the media converter system comprises at least one application identity code. The information extracted from the pluggable module may comprise a protocol identity code associated with the channel, while the information extracted via the media converter system may comprise information on at least one protocol applicable for the channel. Thereby, information on a protocol which is suitable for a specific pluggable module may be identifiable automatically.

An automated process, operating according to a first exemplary embodiment, which enables a pluggable module to act as a plug-in and play device can invoke a suitable operating mode automatically. Such a process can be used for enabling a pluggable module to operate as a triggering tool, suitable for configuring or re-configuring a channel.

The automated process suggested above may comprise a plurality of steps, where a protocol identity code is first extracted from the pluggable module. Next it is determined whether the information extracted via the media converter system comprises a protocol identity code which is associated with the protocol identity code extracted from the pluggable module, by correlating the respective extracted protocol identity codes. In case the two extracted protocol identity codes match the channel is enabled by enabling a transmitter (XAUI-TX; PMD-TX) associated with the channel in case the respective transmitter is disabled, or in case of no match between the two extracted protocol identity codes the channel is instead disabled by disabling a transmitter (XAUI-TX; PMD-TX) associated with the channel in case the transmitter is enabled.

According to another exemplary embodiment, which is preferably executed after field installation of a media converter system, the information extracted from the pluggable module comprises a protocol identity code associated with the channel, wherein the information extracted from the media converter system comprises an indication of at least one operating mode pre-defined for the channel.

According to the second embodiment a protocol identity code is extracted from the pluggable module after which the protocol identity code extracted from the pluggable module has been correlated with a protocol identity of the information extracted from the media converter system. In case of a match in the correlation, the channel is enabled by enabling a transmitter (XAUI-TX; PMD-TX) associated with the channel, in case the transmitter is disabled, or in case of no match in the correlation, the channel is disabled by disabling a transmitter (XAUI-TX; PMD-TX) associated with the channel in case the transmitter is enabled.

The method may also be provided with additional steps for applying an automated log-in procedure where, in addition to protocol identity codes, the application identity codes, also comprises log-in identity codes extractable from the pluggable module, wherein the log-on identity code is a unique vendor specific code which enables a pluggable module to be uniquely identifiable. In a next step the extracted log-on identity is correlated with log-on identities comprised in the information extracted via the media converter system. In case of no match in the correlation the channel is disabled by disabling a transmitter (XAUI-TX; PMD-TX) associated with the channel, in case the channel is enabled.

Furthermore, the application identity codes may also comprise vendor identity codes which are extractable from the pluggable module, wherein said vendor identity codes are indicative of the vendor of the pluggable module, i.e. by applying a vendor identity code, pluggable modules originating from a specific vendor can be identified. A vendor identity code extracted from the pluggable module is correlated with vendor identity codes extracted via the media converter system. In case the vendor identity code of the pluggable module is not comprised in the information extracted via the media converter system the channel is disabled by disabling a transmitter (XAUI-TX; PMD-TX) associated with the channel.

More specifically the information extracted from the media converter system may be extracted from an identity coding library contained at, or accessible to the media converter system.

In order to provide for a fully automatic enabling/disabling process for handling a pluggable module, the steps described above may be repeated for a plurality of channels of the media converter system. Preferably, the automatic enabling/disabling process is repeated at a predefined tracing time for each channel.

According to another aspect, also an arrangement which is suitable for executing the method described above is provided. According to one embodiment the arrangement is provided with a process control function which is operatively connected to a correlation function and an extracting function and which is configured to manage a process for automatically enabling a disabled channel or disabling an enabled channel when the pluggable module is attached to the media converter system, wherein the enabling and disabling is based on a correlation, executable by the correlation function of module specific information extractable from the respective pluggable module by the extracting function and corresponding information extractable from the media converter system by the extracting function.

According to one embodiment, which enables plug-in and play functionality, the extracting function is configured to extract a protocol identity code associated with the channel from the pluggable module, and information on at least one protocol applicable for the channel from the media converter system. The correlating function is configured to correlate the protocol identity code acquired from the pluggable module with the associate information acquired from the media converter system, and the process control function is configured to instruct an enabling/disabling function to enable the channel by enabling a transmitter (XAUI-TX; PMD-TX) associated with the channel in case of a match in the correlating step and in case the transmitter is disabled, or to disable the channel by disabling a transmitter (XAUI-TX; PMD-TX) associated with the channel in case of no match in the correlating step and in case the transmitter is enabled.

According to another embodiment, the extracting function is typically configured to extract information on at least one operating mode which has been pre-defined for the channel and an associated protocol identity code from the media converter system. More specifically, the extracting function may be configured to acquire a protocol identity code from a pluggable module and to identify a protocol on the basis of the acquired protocol identity code. According to the same embodiment, the correlating function may be configured to correlate the protocol identity code extracted from the pluggable module with operating modes and associated protocol identity codes comprised in the information extracted from the media conversion system. As a consequence, the process control function may be configured to instruct an enabling/disabling function to enable the channel by enabling a transmitter (XAUI-TX; PMD-TX) associated with the channel in case of a match in the correlation and in case the transmitter is disabled, or to disable the channel by disabling a transmitter (XAUI-TX; PMD-TX) associated with the channel in case of no match in the correlation and in case the transmitter is enabled.

In order to ensure that a pluggable module is only provided by a qualified vendor or supplier, a log-in identity may also be used as a password-like verification of a qualified pluggable module. The extracting function may therefore be adapted to also extract a log-in identity code, which is a unique vendor specific code, from the pluggable module. Consequently, the correlating function may be further configured to correlate the log-on identity extracted from the pluggable module with log-on identities comprised in the information extracted from the media converting system, and the enabling/disabling function may be configured to disable the channel by disabling a transmitter (XAUI-TX; PMD-TX) associated with the channel in case of no match in the comparison and in case the channel is enabled.

In order to be able to identify pluggable modules of a specific vendor, the arrangement may be further configured to handle also such information. Therefore, in an arrangement according to yet another embodiment the extracting function may be further adapted to extract also a vendor identity code, which is indicative of the vendor of the pluggable module, from the pluggable module. Consequently, the correlating function may be configured to correlate the vendor identity code acquired from the pluggable module to corresponding codes extracted from the media converter system, and wherein the enabling/disabling function (1204) is configured to disable the channel by disabling a transmitter (XAUI-TX; PMD-TX) associated with the channel in case of no match in the correlation.

According to one exemplary embodiment the extracting function may be configured to extract the information extractable from the media converter system from an identity coding library contained in or accessible by the media converter system. Such an identity coding library may be configured to hold at least one of one or more protocol identities, where each protocol identity is associated with an operating mode which is also contained in the identity coding library; one or more vendor identities, where each vendor identity represents a specific vendor, and at least one unique login identity.

In order to provide information on updates and to make such information available to the system the suggested arrangement may further be provided with an alarm generating function which is configured to update an alarm information list upon receiving an instruction from the enabling/disabling function that an enabling or disabling process has been executed.

A system, such as the one described above, normally operates for a plurality of channels, and therefore the process control function will typically be configured to instruct the extracting function, correlating function and enabling/disabling function to repeat the steps described above for at least one additional channel of the media converter system, such that a complete process, covering a channels to be applied in the system is automatically executed when a pluggable module is inserted into a media converter system.

In addition the arrangement may be provided with a monitoring function which is configured to monitor a parameter indicating whether the steps described above are to be repeated, wherein the monitoring is configured to be executed at a predefined tracing time.

According to one embodiment, the media converter system may be configured as a 10GbE media converter system. In addition, such a system may be configured to operate at any of the following modes: a limiting mode supporting one or more SFP+ 10GBase-SR/IR/ER type pluggable modules, and/or a linear mode supporting one or more SFP+ 10GBased-IRM type pluggable modules.

According to another embodiment, the media converter system may be configured as a 1GbE media converter system, and as such the media converter system may further be configured to operate at any of a forced 1GbE bypass mode supporting one or more SFP 1000 Gbase-SX/IX10/IX40/ZX type pluggable modules, and/or an auto negotiation 1GbE bypass mode supporting a 1000Base-T pluggable module.

Further features of the present invention and its benefits can be understood from the detailed description below.

BRIEF DESCRIPTION OF THE DRAWINGS

The invention is now described, by way of example, with reference to the accompanying drawings, in which:

FIG. 5 is a figure illustrating an exemplified Protocol identity customization table, as recommended by the SFF Committee.

FIG. 6 is another figure illustrating an exemplified vendor identity customization table, as recommended by the SFF Committee.

FIG. 7 is yet another figure illustrating a log-in identity customization table according to one exemplifying embodiment FIG. 8 is a figure illustrating an identity coding library according to one exemplifying embodiment.

DETAILED DESCRIPTION

Figure 1:
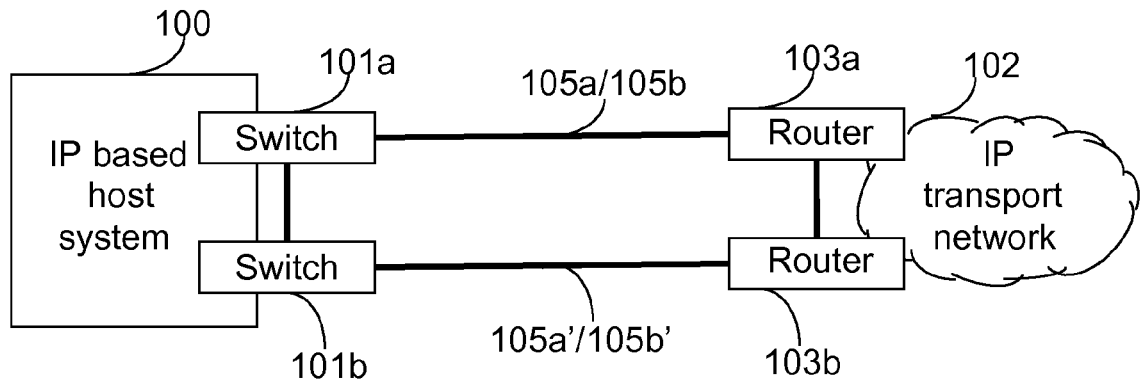
FIG. 1 is a simplified overview of a network configuration according to the prior art which comprises an IP based host system interconnected to an IP transport network.

FIG. 1 is a simplified schematic overview exemplifying a conventional network configuration comprising an IP based host system 100 which is interconnected with an IP transport network 102 via two separate lines, namely a working line, comprising a first pair of link paths 105*a*/105*b*, and a protecting line, comprising a second pair of link paths 105*a'*/105*b'*, where the protecting line has a main purpose of providing for redundancy in the network configuration.

In order to provide both line and the equipment protection, two switches 101*a*, 101*b*, typically 10GbE switches, belonging to the host system are connected to its remote link partner, i.e. IP transport network 102, for the link path redundancy, via a respective router 103*a*,103*b*, typically a 10GbE router. Here, one par of switch and router is used for the working line 105*a*/105*b* and the other par is used for the protection line 105*a'*/105*b'*, respectively. If a link failure occurs in the working line, the redundancy protection systems used by any of the IP based host system 100 and the IP transport network 102 will switch traffic from the failing working line to the protection line.

The 10GBASE-CX4 protocol, which is a typical protocol for supporting an interconnection e.g. via a CX4 cable, specifies a maximum working distance which is limited to 15 m only. Such a limited working distance makes it difficultly to cover the basic demands in the telecom network, which typically ranges from a 200 m working distance for interconnecting applications up to a working distance of a few tens of km for long-haul applications. In order to reach a desired working distance, a media converter system, or more specifically for the present case, a 10GbE media converter system, is needed for the 10GBASE-CX4 based host system to connect the remote link partner. It is to be understood that even though the given examples refer to a 10GbE media converter system, also other types of media converter system configurations may apply the suggested enabling and disabling process.

Figure 2:
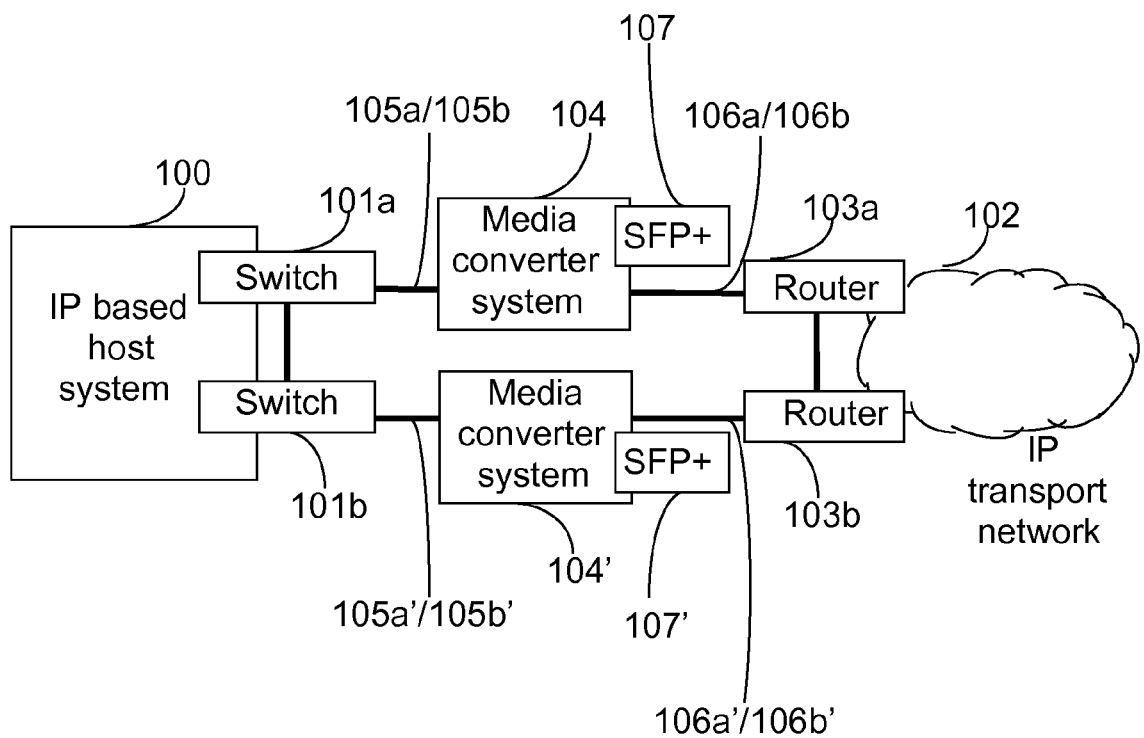
FIG. 2 is another simplified overview of a network configuration comprising an IP based host system interconnected to an IP transport network via media converter systems.

In order to meet the requirements of longer operating distances the system described above with reference to FIG. 1 may be adapted accordingly. FIG. 2 is another simplified schematic overview, exemplifying an alternative network configuration where two media converter systems, such as e.g. two redundant 10GbE media converter systems, have been deployed into the link paths between the switch 101*a*, 101*b* and the router 103*a*,103*b* for the main purpose of increasing the working distance. By applying media converter systems, a link distance up to 40 000 m can be achieved.

The media converter system typically converts a copper-based formatted signal, such as e.g. 10GBASE-CX4, into fiber-optic based formatted signals, such as e.g. 10GBASE-SR/-IR/-ER specified by IEEE802.3ae, or 10GBase-IRM specified by IEEE802.3aq. Since the media converter system only works at the physical network layer, it makes the whole conversion process transparent to the higher layer network devices, e.g. the Ethernet switches, which imply that it will not introduce any interference with higher layer functions in the network.

A media converter system may e.g. be used for supporting a special application where the system of the remote link partner, e.g. a 1GbE switch, is designed to run a low data rate with the fiber-optic based 1000Base-X protocol. With the help of a SFP 1000Base-ZX transceiver module and Single mode optical fibers (SMF), it may even be possible for a media converter system to support data traffic over an 80 000 m transmission distance.

As an example, FIG. 2 shows a network scenario for the deployment of redundant media converter systems. For providing both line and equipment protection, two switches 101*a*,101*b*, in the present example typically 10 GbE switches, belonging to the IP based host system 100 are connected to their remote link partners, i.e. two routers 103*a*,103*b*, in the present example typically 10 GbE routers, for providing link path redundancy. Here, one par of switches and routers are used for both the working line and the protection line, respectively. If the link failure occurs in the working link, the redundancy protection systems used by both the host system and the router system will switch traffic onto the protection line.

The IP bases host system 100 is designed to support the 10GBASE-CX4 protocol with a maximum operating distance of 15 m. In order to increase the link distance, each media converter system 104, 104' is deployed into a respective link path between one of the 10GbE switches and one of the 10GbE routers. The multiple protocols of 10GBase-R, such as e.g. 10GBASE-SR/-IR/-ER/-IRM, can be supported by the media converter systems, which can extend the link distance up to 40 000 m e.g. with the help of a pluggable module 107,107', here represented by pluggable SFP+ modules, such as e.g. 1000Base-ER transceiver modules, and by applying single mode fiber (SMF).

It is to be understood that the remote link partners, i.e. routers 103*a*, 103*b* could be replaced by other devices, such as e.g. 1GbE switches, which are operated with low data rate protocols, such as e.g. 1000Base-SX/-IX10/-IX40/-ZX/-T. In addition, the IP based host system 100 can be re-configured to run 1000Base-X protocol accordingly. The interconnecting cables, i.e. CX4 cables, used for the respective cooper link paths between the IP based host system 100 and the media converter system 104,104' has 4-lanes. For each lane, it can carry up to 3.125 Gbaud of signaling bandwidth. In practice however, only one of four lanes of CX4 cable may be used to support 1GbE data flow. In the given example, the media converter systems 104,104' could also be re-configured to run a 1 GbE bypass mode wherein the SFP+ modules 107,107' should be replaced by respective SFP modules. The selection of SFP module depends on the protocol being used by the remote link partner, e.g. 1000Base-SX/-IX10/-IX40/-ZX.

Figure 3:
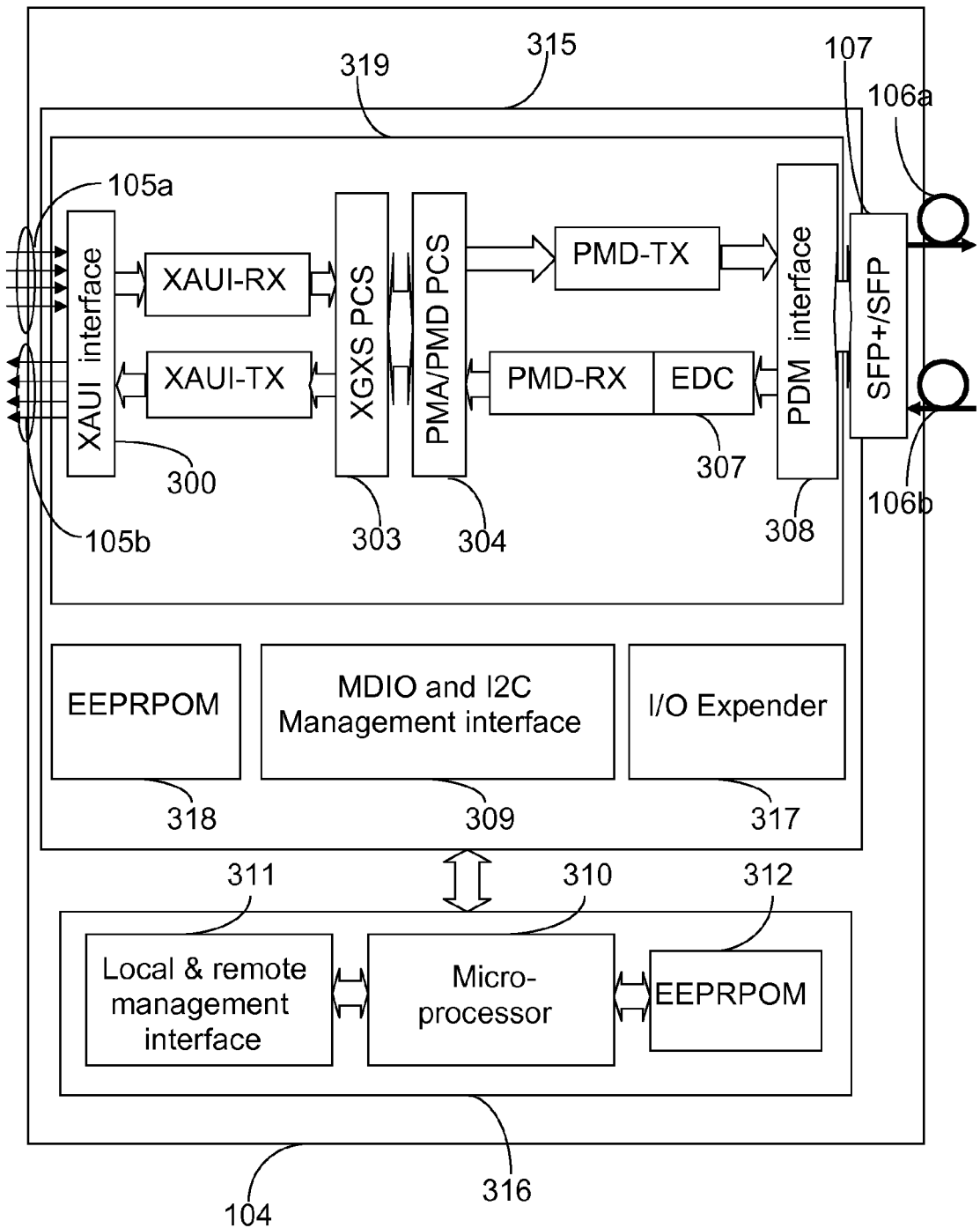
FIG. 3 is a simplified block scheme illustrating a media converter system which is configured to handle pluggable modules.

For supporting the remote link partner who uses the 1000Base-T protocol, the SFP 1000Base-T copper module could be used. This module makes an extra conversion for 1000Base-X to/from 1000Base-T. In this case, the optical fiber is replaced by an electrical conductor cable, such as e.g. an unshielded twisted pair (UTP), type of CAT5 or CAT6, which can be used to reach a distance of 100 in FIG. 3 illustrates a simplified block diagram showing an exemplified system design of a high dense channel media converter system 104, where a redundant system 104' is provided with corresponding functionality. The system typically comprise a main frame 316 and one or more pluggable boards $B_i$ (i=1, 2, ..., N), here represented by one single pluggable board 315. The main frame 316 is mainly in charge of device management and supervision via a few built-in devices, such as a microprocessor 310, a storage means, here represented by an EEPROM 312, a local/remote management interface 311. In addition, the main frame will typically also comprise further devices, such as e.g. a power supply (not shown). The local and remote interface 311 is attached to the micro-processor 310 for enabling execution of supporting tasks, such as e.g. alarm handling and FW upgrading. A key component used by the media converter system is the physical layer device 319, from hereinafter referred to as the PHY, which is typically a single-chip device with a multiple sub-layer construction that follows the design requirements specified by IEEE802.3.

Each pluggable board 315, consists of a PHY 319 for performing a 10GbE and/or a 1GbE media conversion operation, an EEPROM 318, or any other corresponding storage means, an input/output I/O Expender (317), a Management Data Input/Output (MDIO) and I2C management interface 309 enabling connection between the mainframe 316 and the pluggable board 315, where the I2C interface, which is typically a 2 wire interface enables extraction of identity information stored in the built-in EEPROM (not shown) of a SFP+/SFP pluggable module 107. The I2C interface is also used for enabling communication between the microprocessor 310 and the on-board memory device, the EEPROM 318 and the I/O expander 317 that is an extended ZSC interface device for interconnecting SFP+/SFP 107 and EEPROM 318 with the management interface 309. The MDIO interface 309 is mainly used for enabling communication between the microprocessor 310 and the PHY 319. The EEPROM 318 is mainly used for storing inventory data, such as e.g. manufacturing information and/or device configuration information.

One central component in the system is the PHY 319 mentioned above, which is typically a single-chip device with multiple sub-layer construction that follows the design requirements specified by IEEE802.3. For supporting the data traffic through a fiber-optic link path, a number of multiple sub-layers are needed. They mainly consist of the sub-layer of physical media dependent (PMD) with a par of transmitter, PMD-TX 305 and receiver PMD-RX 306, the physical medium attachment (PMA) sub-layer, the 64B/66B physical coding sub-layer (PCS) 304. On the other hand, the sub-layers needed for supporting the data traffic through CX4 copper link path mainly include the 8B/10B FCS, the 10 gigabit media independent interface (XGMII), the optional XGMII extender sub-layer (XGXS) 303, the XAUI with 4 pairs of transmitters XAUI-IX 302 and receivers XAUI-RX 301. As an example of hardware (HW) design, the 10GbE media converter system 104 provides both XAUI 300 and PMD interfaces that can be connected to a CX4 copper cable and SFP+/SFP 107 fiber-optic pluggable transceiver modules via a PMD interface 308.

The XAUI IX 302 and XAUI RX 301 sub-layers provide electrical functionality for transmission and reception of 4-channel serial data running at the speed of 3.125 Gbps. These sub-layers include various functional component, such as e.g. clock multiplication, data serialization/de-serialization, clock data recovery, signal amplification and differential signal driving.

The PMD TX 305 and PMD RX 306 sub-layers provide electrical functionality for transmission and reception of 10 gigabit serial data running at the speed of 10.3125 Gbps. These sub-layers also include various functional component such as e.g. clock multiplication, data serialization/de-serialization, clock data recovery, signal amplification and differential signal driving. The receiver equalization at PMD RX 306 sub-layer may also have a built-in electric dispersion compensation (EDC) function 307, which makes it possible for the PHY 319 not only to optimize the limiting mode with 10GBase-SR/-IR/-ER protocols but also to support a linear mode running at 10GBase-IRM protocol.

An XGXS FCS 303 sub-layer is responsible for coding and decoding data that will be transmitted and received on the XAUI IX 302 and XAUI RX 301. The functionality includes 8B/10B encoding or decoding, randomizing and lane alignment. While, the PMD/PMA FCS 304 sub-layer is responsible for coding and decoding data that will be transmitted and received on the PMD side. The functionality includes data scrambling/descrambling, 64B/66B encoding or decoding, data transitioning, synchronization, multiplexing and phase detecting. The built-in clock multiplication unit (CIM) is used for retiming XAUI TX and/or PMD TX. An additional first-in-first-out (FIFO) device (not shown) is also used for 4-lane alignment and also to accommodate the frequency differences of different function unit, such as e.g. the XAUI clock data recovery, the PMD clock multiplier unit and the external reference clock.

For supporting on-chip device configuration and control, two typical types of communication interfaces are used by the PHY 319, i.e. the MDIO and the I2C. Both MDIO and I2C interfaces 309 are connected to the micro-processor 310 of the main frame 316. An I2C-MUX with Input/Out (I/O) expanders 320 may be used among the motherboard and daughter board for fast detection and response to the status change events of specific devices, e.g. the absent and/or failure of the daughter boards and the pluggable modules.

The memory devices, represented by EEPROMs 312,318, are used for both the pluggable board 315 and the main frame 316, for storing manufacturing information as well as firmware (FW).

The data flows for bidirectional transmission over the media converter system could be summarized as following. Atone of the transmit paths, XAUI-RX 301 typically collects 4-lane 3.125 Gbps data from the XAUI interface 300 and reforms serial 10.3215 Gbps PIM data transmitted by the PMD-TX 305 via the PMD interface 308. On the other hand, the PMD-RX 306 accepts serial 10.3125 Gbps PML data from the XAUI interface 300 and reforms the data for transmission on 3.125 Gbps 4-lane XAUI-TX 302.

To support different applications, an advanced 10GbE media converter system may accommodate different types of optical SFP/SFP+ modules via the PMD interface 308.

The limiting mode is one of the operating modes of a media converter system. This mode is used to support different types of SFP+ optical modules that may operate with different protocols, such as e.g. any of the 10GBase-SR/-IR/-ER.

The linear mode refers to the operating mode that support protocols such as e.g. the 10GBase-IRM protocol. With this mode, a post amplifier of the pluggable modules may be removed and replaced by an EDC. The EDC can be positioned either inside the optical modules, e.g. XFP/X2/XEN-PAK 10GBase-IRM modules, or as a built-in device of PMD RX belonging to the host the PHY for supporting SFP+ 10GBase-IRM module.

The introduction of EDC is to overcome a strong fiber-dependence in the use of 10GBase-SR protocol, the so-called differential mode delay (DMD). The DMD is caused by the difference in the effective velocity of the different fiber modes caused by imperfections in the index profiles of the fibers. Because of DMD, the conventional 10 Gbps serial transmission over legacy multimode fibers (MMF) is severely limited.

The 10GBase-SR based optical modules only support 26 m of MMF with the modal bandwidth of 160/500 MHz·km, i.e. the so-called FDDI-grade type, 33 m of MMF with the modal bandwidth of 200/500 MHz·km, i.e. the so-called OM1 type, 82 m of MMF with the modal bandwidth of 500/500 MHz·km, i.e. the so-called OM2 type, and 300 m of MMF with the modal bandwidth of 1500/500, i.e. the so-called OM3 type, respectively. The problem becomes more complex because the DMD can also vary with time due to fiber movement, temperature variation and other effects that change the optical power distribution across the mode group.

The technical investigation of DMD problems leads to 10GBase-IRM standardization, i.e. IEEE 802.3aq, and a technical solution for the DMD is to introduce a receiver equalization, i.e. an EDC together with other technologies, such as constrained laser launch conditions and optical mode filtering. With the EDC technology, the DMD can be compensated for different types of MMF. Thus, the link distance can be extended up to 220-300 m for most of legacy MMF, such as e.g. FDDI-grade, OM1, OM2, OM3, running at the wavelength of 1310 nm.

As already addressed above, a 10GbE media converter system may also operate in 1GbE bypass modes to support the applications that reply on fiber-optic solution using 1000Base-SX/-IX10/-IX40/-ZX and 1000Base-T protocols. With the 1GbE bypass mode, a single lane of CX4 cable may be used. And, a number of sub-layers of the PHY may be applied to the data flow, e.g. both XAUI PCS and PMD/PMA PCS sub-layers. Thus, the original protocol running by the host system, e.g. 1000Base-X, will be maintained after passing through the media converter system. There are two 1G bypass modes which may be supported by the 10GbE media converter, i.e. the forced 1000Base-X mode and the auto-negotiation 1000Base-X mode specified by IEEE802.3 Clause 37, 2005.

The MDIO specified by IEEE802.3 clause 45 provides a simple serial management interface between the PHY and the external micro-processor shown in FIG. 3. With the help of MDIO, the status of all MDIO manageable devices (MMD), such as the PHY, can be accessed, monitored and controlled by the micro-processor. For example, the MMD device addresses 1, 3 and 4 are well-specified to PMD, FCS and XAUI sub-layers in clause 45, respectively. For each device, a number of 16-bit registers can be defined for different purposes, mainly to read the device status and to execute the control and/or test functions of on-chip devices. For each bit of the register, a specific function can be assigned. It is to be understood that for getting a specific status and/or for executing a specific function for the device, the combination of a number of bits from one or more devices may be used simultaneously.

For supporting the forthcoming processes, the most interesting registers would be the status registers that define the operating modes, i.e. the 10 GbE limiting mode, the linear mode, the forced 1GbE bypass mode, the auto negotiation 1GbE bypass mode, the link status registers for both XAUI-RX and PMD-RX receivers, and the control registers for both XAUI-TX and PMD-TX transmitters.

In case of booting or rebooting of a media converter system, the process of initialization will be executed for all pluggable boards in the system. The process checks the manufacturing data from the EEPROM for both the main frame and the pluggable boards in order to identify the type of the PHY and to download the latest configurations, such as e.g. the operating mode, needed for the operation of the PHY of pluggable boards. During the initialization, the process also performs self-tests for on-board devices, including the PHY.

As already mentioned above, there are up to $B_i$ (i=1, 2, ..., N) pluggable boards that could be connected to a respective interface port $IP_i$ (i=1, 2, ..., N) on the main frame. As of a part of an ordinary process, executing tasks such as e.g. device initialization and configuration, a process for the control of pluggable board absent will be invoked and executed. It is to be understood that if a pluggable board is absent on an interface port, it will not be possible for the micro-processor of the main frame to extract the information from the EEPROM of the pluggable board. Thus, an alarm for the pluggable board absent will be reported. As a consequence, all processes for handling a pluggable mode and/or operating modes will also be disabled for this interface port.

For each pluggable board, there are up to $P_j$ (j=1, 2, ..., M) channels that can support one or more SFP+/SFP modules, when the module is attached to the pluggable board via the SFP+/SFP interface. For SFP+/SFP modules, the module absent check can typically be done via the Pin 6, the so-called MOD-ABS for SFP+ (cf. SFF-8431), or the MOD-DEF0 for SFP (cf. SFP-MSA, 2000), respectively. The module absent pin can be connected to the micro-processor e.g. via interrupts of an I/O expander. If SFP+/SFP module absent occurs for a specific channel j, the micro-processor will receive an interrupt request, and can then take action, e.g. by disabling both the fiber-optic and the copper links for this channel. The transmitter $TX_j$ of the PHY may also be switched off.

According to MSA, a SFP+/SFP module should provide a serial communication interface that allows the access of the built-in EEPROM of the module where the sophisticated information and the application ID codes are stored. Two serial bus addresses, A0h and A2h are defined for accessing information in the EEPROM (not shown) of an SFP+/SFP module 107, but also other addresses may be used for this purpose. The EEPROM is typically organized as a series of 8-bit data words that can be addressed individually or sequentially. When the serial protocol is activated, both a serial clock signal (SCL for SFP+ or MOD-DEF1 for SFP) and a serial data signal (SDA for SFP+ or, MOM-DEF2 for SFP) can be generated for a bi-directional serial data transfer.

Figure 4:
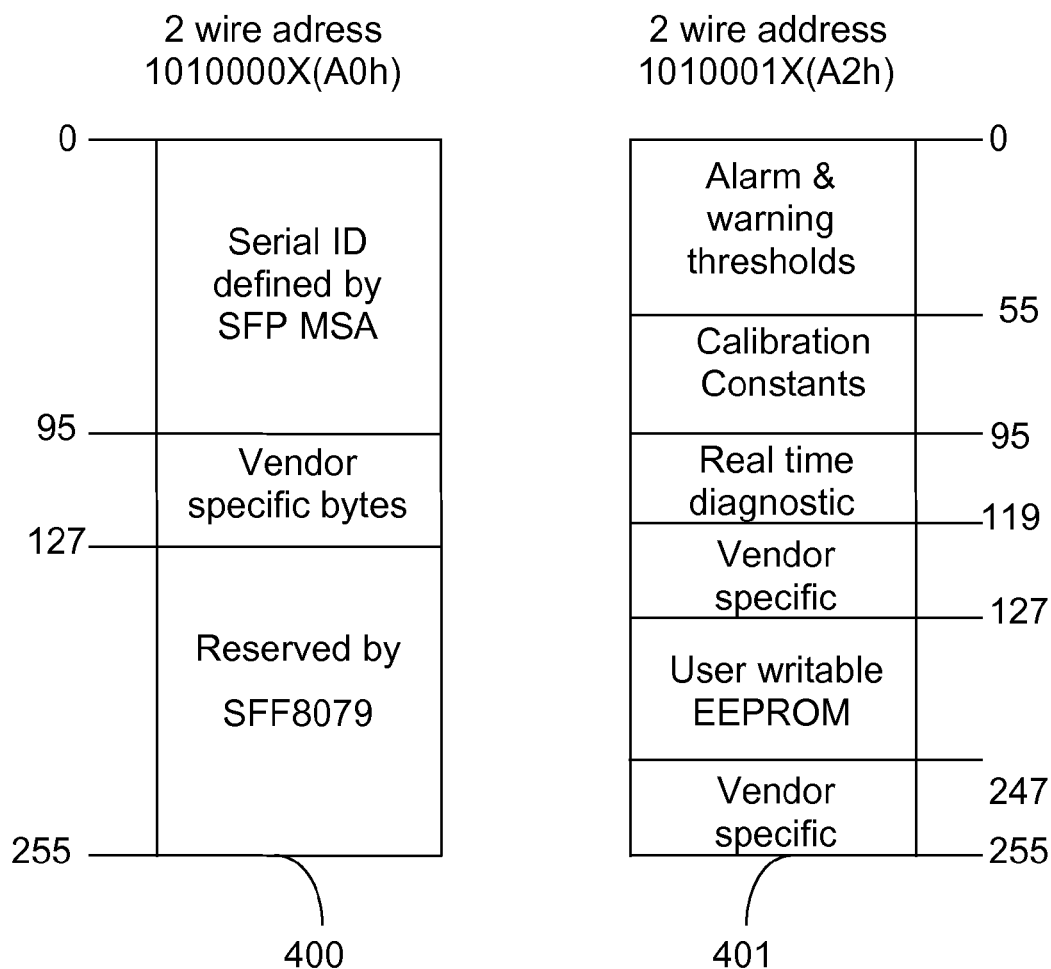
FIG. 4 is illustrating an exemplified EEPROM map structures applicable for SFP and SFP+ modules, as specified by the SFF Committee.

FIG. 4 shows two exemplifying EEPROM map structures for SFP+/SFP modules, specified by the SW committee. With the 2 wire address 1010000X address A0h, as illustrated in the left map structure 400 the memories have been separated into three separate areas. The first 96 bytes are used for serial ID specified by SFP MSA, while the 32 bytes in the second area, i.e. bytes 96-127, are used for storage of vendor specific information. The third area, specified by bytes 128-255, is reserved by SFP MSA.

For the 2 wire address 1010001X (A2h), another map structure 401 to the right of FIG. 4 includes 6 areas for specifying required accuracies of monitoring parameters and value assignment needed for defining parameters associated with alarm and warning thresholds in the first 55 bytes (bytes 0-55), calibration constant (byte 56-95), real-time diagnostic interface (byte 96-119) user writable EEPROM (bytes 128-247), while bytes 248-255 defines a vendor specific area.

According to MSA and SFF, two fields in the Serial ID area of map structure 400 of FIG. 4, namely bytes 3-10 and 37-39 are well specified for coding information of electronic/optical compatibility and vendors IEEE company IDs, the so-called Vendor OUI, respectively. These fields may be customized such that formation of protocols used by the pluggable modules and information for qualifying the module vendors or supplier may be provided. With the suggested customization, two types of ID codes are introduced, i.e. the protocol ID, or the transceiver ID, and the vendor ID codes.

The protocol ID codes, which can alternatively be referred to as the transceiver ID codes, may be used to provide protocol identification for each individual pluggable module which can be used together with a media converter system. FIG. 5 shows an example on how these protocol ID codes may be specified. In the given example, bytes 3-9 and 10, respectively in the Serial ID area, using bytes 0-95 in map structure 400 of FIG. 4 according to MSA/SFF, are used for storing the protocol ID codes. Alternatively, bytes 96-127 in map structure 401 may be used in a corresponding way. In the latter case each vendor is free to define the information to be written in the mapping area.

A vendor ID code is dedicated to be a unique identity for indicating qualified module vendors or suppliers. In FIG. 6, a number of well-known pluggable module vendors or suppliers are listed for exemplification purposes in the given IEEE vendor ID customization. As indicated in the present example, Vendor Organizationally Unique Identifier (OUI) can be used to specify the vendor ID codes. In the given example bytes 37-39 of address A0h is used.

In order to ensure that pluggable modules are only provided by qualified vendors or suppliers, a log-in ID code may be used as a "password" for qualifying a pluggable module in addition to the protocol ID. The log-in ID may be stored in write-protected bytes of the Vendor Specific area. By way of example, serial bus address A0h or A2h can be used to store the log-in ID codes. In FIG. 7 the word of "PASSWORD" is used as an example to show how to a log-in ID can be defined. In the given example, the log-in ID is represented by ASCII printable characters and stored in the Vendor Specific area with bytes 248-255 of serial bus address of A2h. In a corresponding way serial bus address A0h, any 8 bytes belonging to vendor specific bytes 120-127 may be used as an alternative.

To avoid a possible confliction with the reserved standard compliance codes being specified by MAS/SFF, the protocol ID may alternatively be established using the vendor specific area.

In order to be able to handle the pluggable modules and the operating modes associated with these modules, a systematic information storage of the media converter system, which may typically be referred to as an ID coding library is created and implemented into the FW of the media converter system, wherein the media converter system is configured such that different types of ID codes can be collected and classified in the ID coding library, and such that these ID codes can be accessible from the media converter system. In addition, the ID codes are correlated to corresponding operating modes of the PHY.

FIG. 8 shows an example of an ID coding library. For simplification, only hex values of different types of ID codes have been tabulated. With the library, different types of ID codes, particularly the protocol ID code extractable from pluggable modules, can be directly correlated to a corresponding protocol ID code of the ID coding library, where each such protocol ID code is associated with an operating mode.

For presenting one possible way of obtaining such a correlation mathematically, one may assume that the protocols collected by the library according to FIG. 8 are defined by T, where $T=T\{t_1, t_2, \ldots, t_8, t_9\}$, where $t_1$=10GBASESR, $t_2$=10GBASE-IR, $t_3$=10GBASE-ER, $t_4$=10GBASE-IRM, $t_5$=1000BASE-SX, $t_6$=1000BASE-IX10, $t_7$=1000BASE-LX40, $t_8$=1000BASE-ZX, and $t_9$=1000BASE-T, while, the operating modes collected by the library are $K=K\{k_1, k_2, k_3, k_4\}$, where $k_1$=10GbE limiting mode, $k_2$=10GbE linear mode, $k_3$=Forced 1GbE bypass mode, and $k_4$=Auto-negotiation 1GbE bypass mode. One may get the following correlation between the protocols T and the operating modes K:

$$T\{t_1,t_2,t_3\} \in K\{k_1\}, T\{t_4\} \in K\{k_2\}, T\{t_5,t_6,t_7,t_8\} \in K\{k_8\} \text{ and } T\{t_9\} \in k\{k_4\} \quad (1)$$

A process for handling both pluggable modules and operating modes can be divided into a pre-process and two main-processes, from hereinafter the main processes are referred to as main process A and main process B. The pre-process and the two main-processes are typically executed by the microprocessor, but may alternatively be executed by another processing means of a media converter system.

Figure 9:
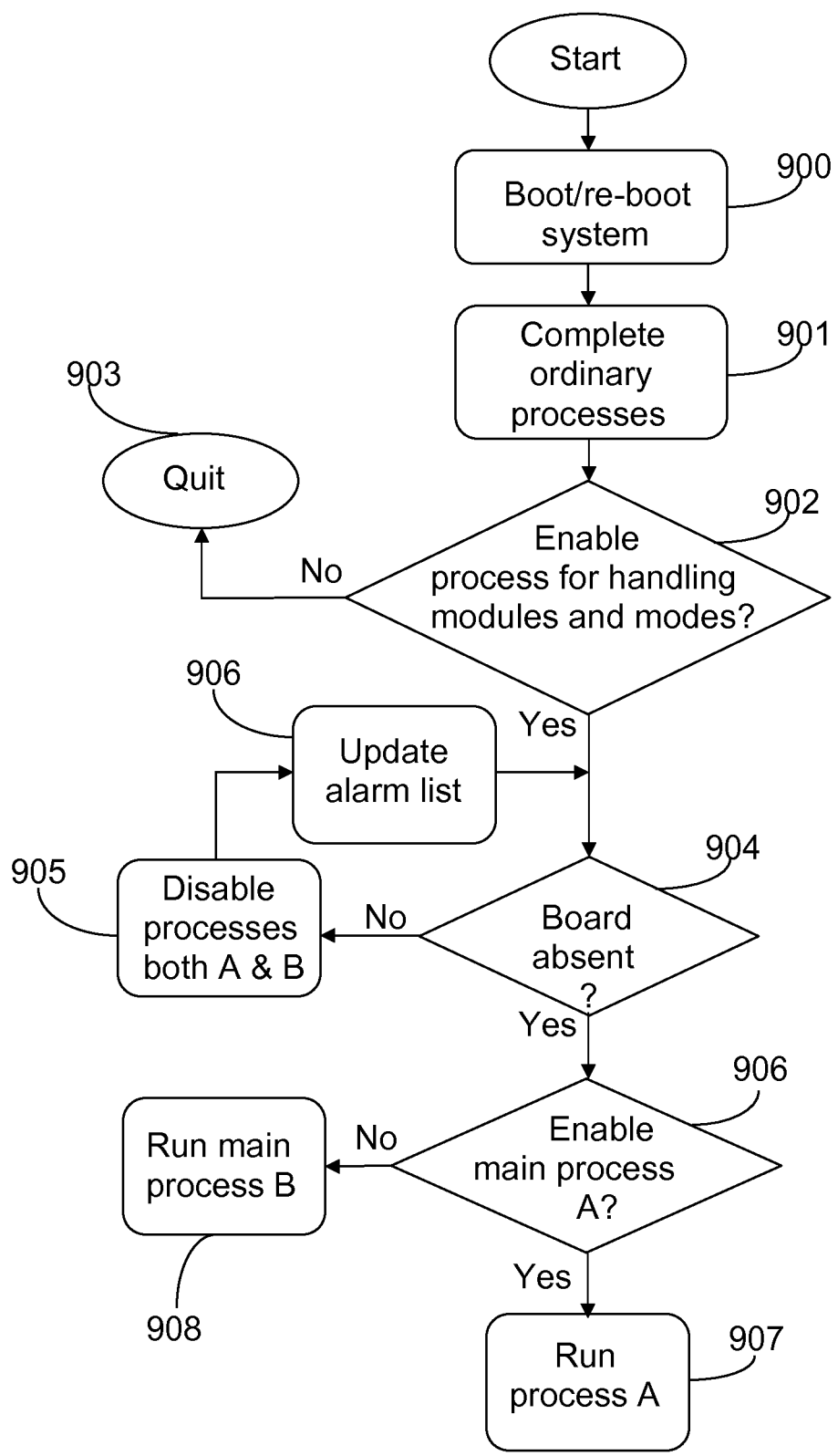
FIG. 9 is a flow chart illustrating a pre-process according to one exemplary embodiment which is adapted to prepare a media converter system for an automatic channel enabling and disabling process.

FIG. 9 is a flow chart illustrating a pre-process according to one exemplary embodiment which is executable for each interface port $IP_i$ (i=1, 2 . . . i . . . N–1, N) of the main frame. For an interface port $IP_i$ the pre-process is executed in association with booting or re-booting of a media converter system, as indicated in a first step 900. In a next step 901 ordinary processes needed for a media converter system, such as the initialization of the PHY, updating of register values and execution of self-tests for on-board devices, are completed.

In a subsequent step 902, a global parameter is created to determine if one should enable the process for handling SFP+/SFP modules and operating modes. If the answer is negative, the process will be terminated, as indicate with a step 903, while the process is instead enabled if the answer is positive. If enabled, the process continues with the next step 904, the process checks the respective interface port $IP_i$ (i=1, 2 . . . i . . . N–1, N) on the main frame for the control of whether a pluggable board is absents and/or has a failure. If the answer is positive for the port $IP_i$, the process will terminate any ongoing process for the interface port $IP_i$, as indicated with a step 905 and the alarm information list in the EEPROM that is stored on the main frame is updated as indicated in another step 906. With the stored alarm information, the pluggable board absent and/or failure can be traced if required. On the other hand, if it is detected that a pluggable board is present, the process will determine which one of the main-process, i.e. main-process A or main-process B that is to be invoked according to a pre-defined operation, as indicate in another step 906. The described pre-process will typically be operated in real-time, such that the interrupting status of interface port $IP_i$ is monitored continuously. A typical tracing time during such a monitoring may be 5 ms.

Figure 10:
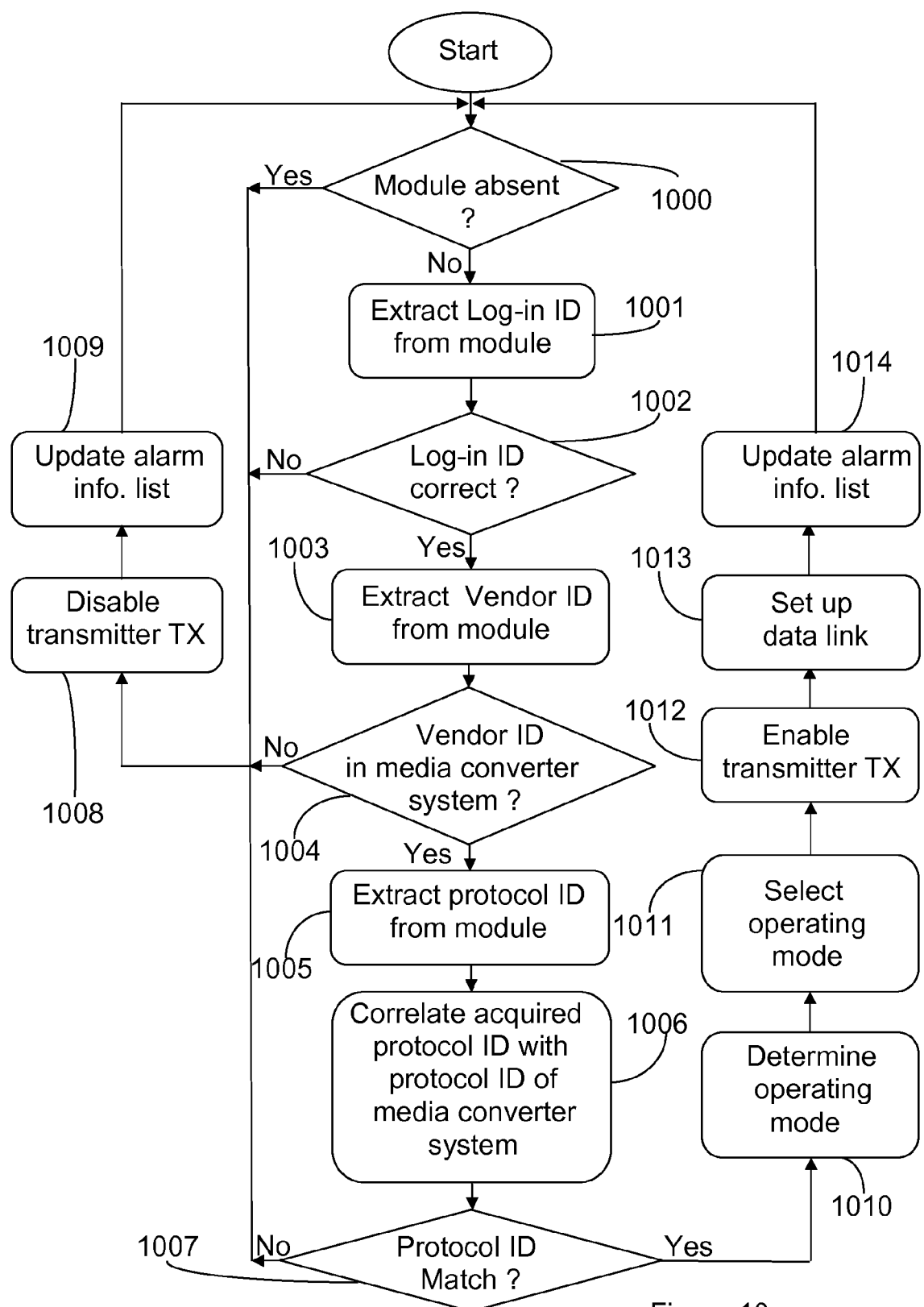
FIG. 10 is a flow chart illustrating a process for automatically enabling or disabling a channel at a media converter system comprising a pluggable module according to one embodiment.

FIG. 10 is a flow chart which is illustrating a main-process A, according to one exemplary embodiment, which may also be referred to as a "plug-in and play" process. With main-process A, a pluggable module is used as a triggering tool to configure or re-configure a channel $C_j$ of a pluggable board $B_i$ for adapting transmitters XAUI-TX; PMD-TX accordingly and for invoking a suitable operating mode for the respective channel $C_j$. The process is typically repeated for a plurality of channels $C_j$, and pluggable boards, $B_i$, where i=1, 2, . . . N, j=1, 2, . . . , M, such that all channels and pluggable boards are automatically made operational in response to a pluggable board being inserted to the SFP+/SFP interface of a media converter system.

The process starts with a module absent control for channel $C_j$ of pluggable board $B_i(C_j)$, as indicated with a step 1000. If in step 1000 it is found that a pluggable module is missing, the port will be disabled by switching off the transmitter TX of the PHY, as indicated with a step 1008, and the alarm information list will be updated, as indicated with another step 1009. The module absent will be traced in real-time, which is done by monitoring the interrupt status of board absent, typically via an I/O expander.

Following the module absent control, the process may extract and check a log-in ID, if applicable, and the Vendor ID, respectively against corresponding IDs stored at the media converter system, e.g. in the ID coding library, as indicated with steps 1001-1004. Both the log-in ID code and the Vendor ID code are extracted from the pluggable module via the 2-wire I2C. A unique Log-in ID code "PASSWORD" may be used as a criterion to determine if a pluggable module has been customized according to pre-defined requirements. If the Log-in ID control is verified, the Vendor ID code of the module is then compared to corresponding codes stored in the ID coding library for ensuring that the pluggable module is provided by a qualified vendor or supplier. If the Vendor ID is disqualified, i.e. in case of no match when comparing to the corresponding IDs of the ID coding library, in step 1007 the channel will be disabled, according to step 1008.

In a next step, in case of an approved vendor ID, the module will also undergo a Protocol ID control, as indicated with another step 1005. In this step, a protocol ID code t* is extracted from the module. If, after a correlation of the extracted protocol ID with a corresponding protocol ID of the ID coding library, it is found that t* is a valid protocol belonging to the collection of protocols T in the code library (i.e. $t^*=t_1$ or $t_2, \ldots,$ or $t_n$, $t^* \in T=T\{t_1\ t_2, \ldots, t_n\}$), the module will be accepted. Otherwise it will be rejected. n is the total number of protocols supported by the PHY of the system. As a consequence of a rejection, the corresponding transmitter PMD-TX, XAUI-TX will be disabled. However, if the module passes the protocol ID control, the following steps are instead executed. By using data stored in the ID coding library, such as e.g. the one exemplified in FIG. 8, as indicated in a step 1007, the ongoing process determines a most suitable operating mode k* for matching the identified protocol t*, as indicated in steps 1010 and 1011 respectively, where k*=$k_1$, or $k_2$, ..., or $k_m$, k*∈K=K{$k_1$ $k_2$, ..., $k_m$}, $k_m$ are valid operating modes.

In a next step 1011 the PHY is re-configured to run the determined operating mode k*, specified in the ID coding library if the operating mode which has been pre-configured for the channel is not the same as the determined one. In another step 1012, the transmitter, i.e. the PMD-TX or the XAUI-IX is enabled if it is found that it is switched off, and in yet another step 1013, the respective data link is setup with the remote link partner for supporting data traffic. In addition, an alarm information list is updated according to the enablement, as indicated in a step 1014.

Again, the main-process A is typically a real-time process. The process will continuously monitor the interrupt status of module absent for each invidious channel of each pluggable board, i.e. for each $B_i(C_j)$ of the system.

Since main-process A can directly change the configuration of operating mode of a channel for any type of pluggable modules, the experienced operator will be able to avoid unwanted operations. The process described above is preferably configured for use during activities, such as e.g. during technical evaluation, manufacturing or during installation of media converter system, i.e. during a process which is executed prior to the installation of the media converter system in the field. By applying main process A, time-consuming and tedious tasks which are normally required for channel configuration or re-configuration may be reduced considerably.

Figure 11:
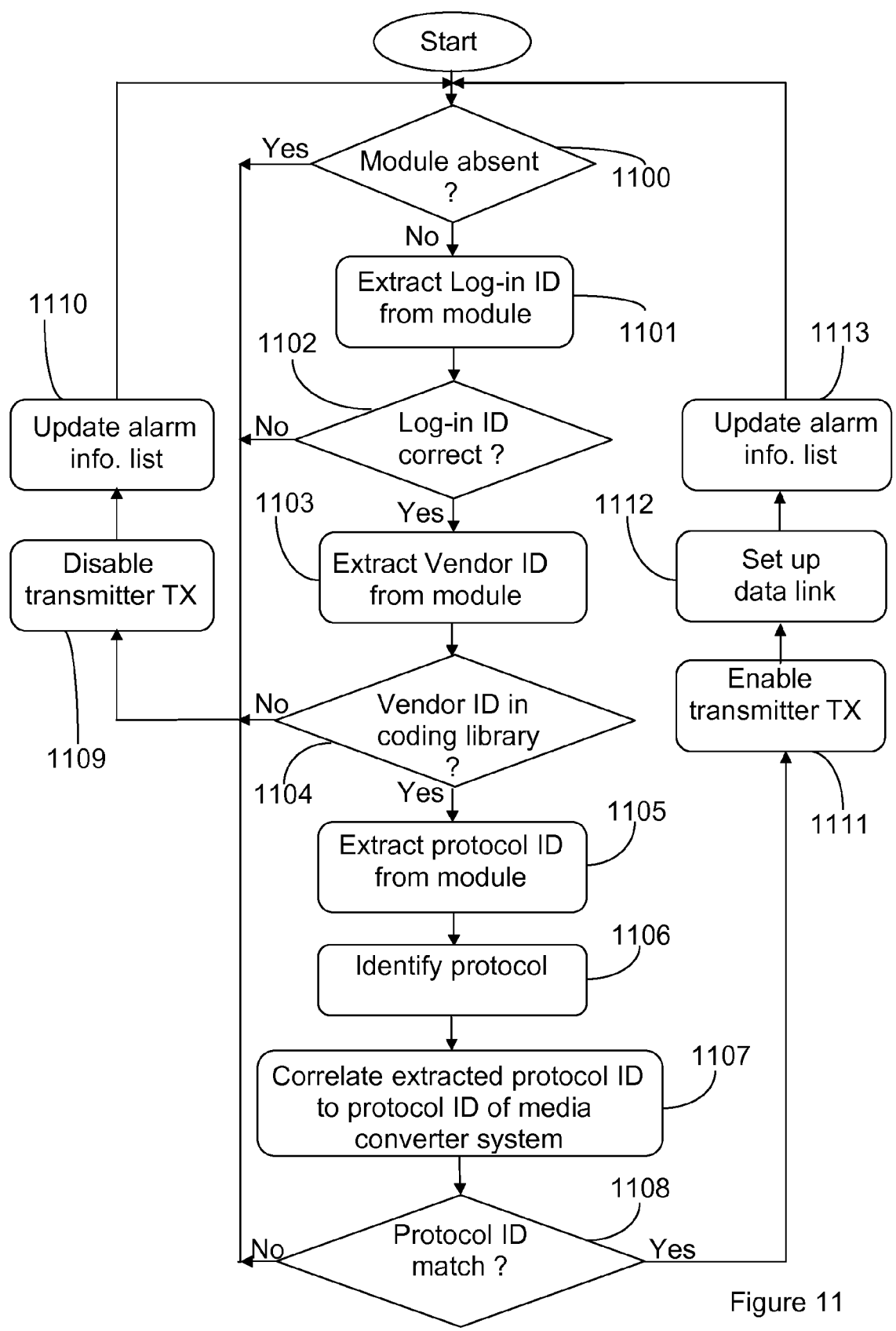
FIG. 11 is another flow chart illustrating a process for enabling or disabling a channel at a media converter system at a media converter system comprising a pluggable module according to another embodiment.

FIG. 11 is a flow chart which is illustrating another process, here referred to as the main-process B. The main-process B is developed to fulfill the basic demand infield applications, e.g. after installation of a media converter system, when the protocols used by the host system, the media converter and the remote link partner are fixed.

The main-process B, does not allow a change of operating mode k which has already been pre-defined for each respective channel, e.g. in main process A as described above. After having executed steps 1100-1105, which corresponds to steps 1000-1005 in FIG. 10, a control of the protocol ID is executed by checking if the extracted protocol of module t* matches an operating mode k, pre-defined for the respective channel and stored in the ID code library, as indicated in a step 1107. If the answer is negative, the channel will be disabled, as indicated in step 1109, otherwise the channel will be enabled, as indicated in a step 1111. Main-process B, helps an operator to avoid unwanted operations, such as plugging an incorrect type of module into a channel, during field installation.

Figure 12:
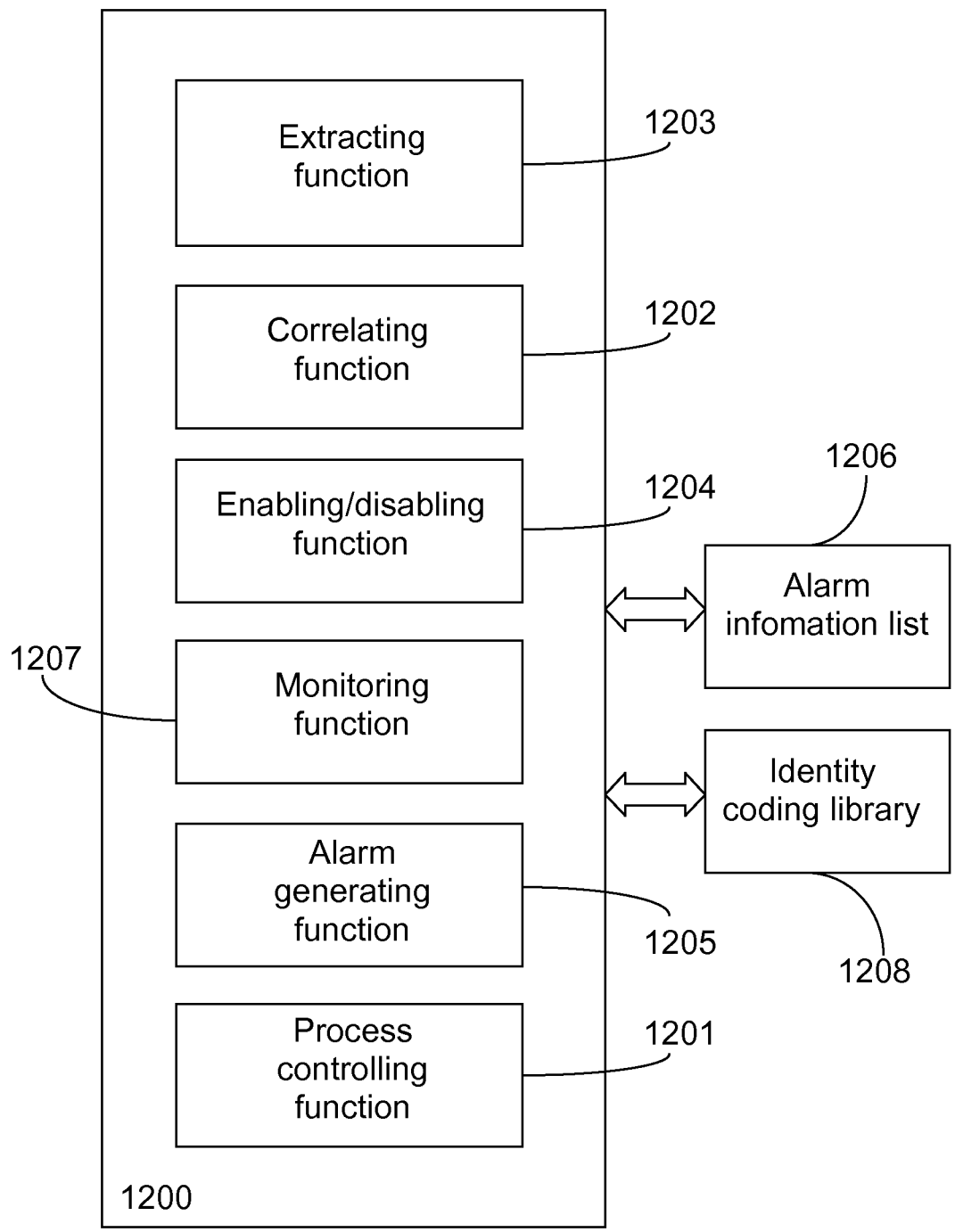
FIG. 12 is a simplified illustration of an arrangement configured to execute any of the processes described above.

FIG. 12 is an exemplifying illustration of an arrangement 1200, to be implemented at a media converter system of a network configuration for the purpose of handling a pluggable module selectable from a plurality of pluggable modules. The arrangement may typically be managed by the micro-processor, where a function, here referred to as a process control function 1201 is operatively connected to a correlation function 1202 and an extracting function 1203. The process control function 1201 is configured to manage a process for automatically enabling a disabled channel or disabling an enabled channel when said pluggable module is attached to the media converter system, wherein the enabling and disabling is based on a correlation, executed by the correlation function 1202, of module specific information extracted from the respective pluggable module by the extracting function 1203 and corresponding information extracted from the media converter system by the extracting function 1203.

More specifically, the extracting function 1203 may be configured to extract a protocol identity code associated with a respective channel from the pluggable module, and information on at least one protocol applicable for the channel from the media converter system. If protocol identity codes are considered, the correlating function 1202 may be configured to correlate the protocol identity code with the associate information acquired from the media converter system, wherein the process control function 1201 is also configured to instruct an enabling/disabling function 1204 to enable the channel by enabling a transmitter (XAUI-TX; PMD-TX) associated with the channel in case of a match in the correlating step and in case the transmitter is disabled, or to disable the channel by disabling a transmitter (XAUI-TX; PMD-TX) associated with the channel in case of no match in the correlating step and in case the transmitter is enabled.

According to another embodiment, the extracting function 1203 may be configured to extract information on at least one operating mode pre-defined for the channel and an associated protocol identity code from the media converter system. The extracting function 1203 may be configured to acquire the protocol identity code from the pluggable module and to identify a protocol on the basis of the protocol identity code, wherein the correlating function is typically configured to correlate the extracted protocol identity code with operating modes and associated protocol identity codes comprised in the information extracted from the media conversion system, and wherein the process control function 1201 is configured to instruct an enabling/disabling function 1204 to enable the channel by enabling a transmitter (XAUI-TX; PMD-TX) associated with the channel in case of a match in the correlation and in case the transmitter is disabled, or to disable the channel by disabling a transmitter (XAUI-TX; PMD-TX) associated with the channel in case of no match in the correlation and in case the transmitter is enabled.

In addition, the extracting function 1203 may be further adapted to extract a log-in identity code from the pluggable module, wherein the log-on identity code is a unique vendor specific code. In such a scenario, the correlating function 1202 may further be configured to correlate the extracted log-on identity with log-on identities comprised in the information extracted from the media converting system, and wherein the enabling/disabling function 1204 may be configured to disable the channel by disabling an enabled transmitter (XAUI-TX; PMD-TX) associated with the channel in case of no match in the comparison and in case the channel is enabled.

The extracting function 1203 may also be adapted to extract a vendor identity code from said pluggable module, wherein the vendor identity code is indicative of the vendor of the pluggable module. If also vendor identities is applied the correlating function 1202 may also be configured to correlate the vendor identity code to corresponding codes extracted from the media converter system, and wherein the enabling/disabling function 1204 is configured to disable the channel by disabling an enabled transmitter (XAUI-TX; PMD-TX) associated with the channel in case of no match in the correlation.

The arrangement 1200 typically also comprises an alarm generating function 1205, which is configured to update an alarm information list 1206 upon receiving an instruction from the enabling/disabling function 1204 that an enabling or disabling process has been executed.

In addition, the process control function 1201 may be configured to instruct the extracting function 1203, correlating function 1202 and enabling/disabling function 1204 to repeat the steps described above for at least one additional channel of the media converter system.

The arrangement typically also comprises a monitoring function 1207 which is configured to monitor, at a predefined tracing time, whether the steps described above are to be repeated.

The information extractable from the media converter system may be extracted from a dedicated storage area, which may e.g. be referred to as an identity coding library 1208, as indicated in the figure. If such an identity coding library 1208, or any other corresponding storage area is applied, it may be configured to hold at least one of one or more protocol identities, each of which is associated with a specific operating mode; at least one vendor identity, each of which is associated with a specific vendor, and at least one unique log-in identity.

Abbreviations
EDC Electric Dispersion Compensation
EEPROM Electrically Erasable Programmable Read Only Memory
FIFO First-In-First-Out
GbE Gigabyte Ethernet
I2C Two-wire serial Interface
IP Internet Protocol
LOL Loss Of link
PHY Physical layer Device
SMF Single Mode optical Fibers
MDIO Management Data Input/Output
MMD MDIO Manageable Device
MMF Multi Mode Fiber
PCS Physical Coding Sub-layer
PMA Physical Medium Attachment
PMD Physical Media Dependent
XGXS XGMII extender Sub-layer

The invention claimed is:

1. A method, at a local media converter of a network, for handling a locally-attached pluggable module selectable from a plurality of pluggable modules, the method comprising:
automatically enabling or disabling a channel of the local media converter when the pluggable module is physically attached to the local media converter, on the basis of a correlation between module-specific information extracted from the locally-attached pluggable module and corresponding information extracted from the local media converter;
wherein the information extracted from the local media converter comprises at least one of:
one or more protocol identity codes and an operating mode associated with each respective protocol identity code;
one or more vendor identity codes, each of which is associated with a specific vendor; and
one or more unique log-in identity codes;
automatically enabling or disabling one or more additional channels of the local media converter on the same basis;
automatically enabling or disabling the channels at a pre-defined tracing time for each of those channels.

2. The method of claim 1, wherein the information extracted from the locally-attached pluggable module comprises at least one of:
a protocol identity code corresponding to one of the one or more protocol identity codes extractable from the local media converter;
a vendor identity code corresponding to one of the one or more vendor identity codes extractable from the local media converter; and
a unique log-in identity code corresponding to one of the one or more log-in codes extractable from the local media converter.

3. The method of claim 1, wherein the information extracted from the locally-attached pluggable module comprises an application identity code associated with the channel, and wherein the information extracted from the local media converter comprises at least one application identity code.

4. The method of claim 3, wherein the application identity code included in information extracted from the locally-attached pluggable module comprises a protocol identity code associated with the channel, and wherein the information extracted from the local media converter further comprises, for each application identity code included in information extracted from the local media converter, associated information on at least one protocol applicable for the channel.

5. The method of claim 4, further comprising:
determining whether the information extracted from the local media converter comprises a protocol identity code which is associated with the protocol identity code included in information extracted from the locally-attached pluggable module, by correlating the respective protocol identity codes;
when a transmitter associated with the channel is disabled and the determining indicates the information extracted from the local media converter comprises a protocol identity code that is associated with the protocol identity code extracted from the locally-attached pluggable module, enabling the channel by enabling the transmitter; and
when the transmitter associated with the channel is enabled and the determining indicates the information extracted from the local media converter comprises a protocol identity code that is not associated with the protocol identity code extracted from the locally-attached pluggable module, disabling the channel by disabling the transmitter.

6. The method of claim 5, further comprising selecting an operating mode on the basis of the correlation.

7. The method of claim 1, wherein the information extracted from the locally-attached pluggable module comprises a protocol identity code associated with the channel, and wherein the information extracted from the local media converter comprises a corresponding protocol identity code and at least one operating mode pre-defined for the channel.

8. The method of claim 7, further comprising:
extracting the protocol identity code from the locally-attached pluggable module and identifying a protocol;
correlating the protocol identity extracted from the locally-attached pluggable module with a protocol identity included in the information extracted from the local media converter;
when a transmitter associated with the channel is disabled and the correlation indicates a match between the protocol identity extracted from the locally-attached pluggable module and the protocol identity indicated by the information extracted from the local media converter, enabling the channel by enabling the transmitter; and
when the transmitter associated with the channel is enabled and the correlation does not indicate a match between the protocol identity extracted from the locally-attached pluggable module and the protocol identity indicated by the information extracted from the local media converter, disabling the channel by disabling the transmitter.

9. The method of claim 1, further comprising:
extracting a log-in identity code included in the information extracted from the locally-attached pluggable module, wherein the log-on identity code is a unique vendor specific code;
correlating the log-on identity code with log-on identity codes included in the information extracted from the local media converter; and
when the channel is enabled and the correlation does not indicate a match between the log-on identity code and one of the log-on identity codes included in the information extracted from the local media converter, disabling the channel by disabling a transmitter associated with the channel.

10. The method of claim 1, wherein the information extracted from the locally-attached pluggable module comprises an application identity code associated with the channel, and wherein the method further comprises:
extracting a vendor identity code included in the application identity code, wherein the vendor identity code is indicative of the vendor of the pluggable module;
correlating the vendor identity code with vendor identity codes included in the information extracted from the local media converter; and
when the correlating does not indicate a match between the vendor identity code and one of the vendor identity codes included in the information extracted from the local media converter, disabling the channel by disabling a transmitter associated with the channel.

11. The method of claim 1, wherein the information extracted from the local media converter is extracted from an identity coding library.

12. A local media converter of a network for handling a locally-attached pluggable module selectable from a plurality of pluggable modules, the local media converter comprising:
a processor configured to:
automatically enable or disable a channel of the local media converter when the locally-attached pluggable module is physically attached to the local media converter, based on a correlation between module-specific information extracted from the locally-attached pluggable module and corresponding information extracted from the local media converter;
automatically enable or disable one or more additional channels of the local media converter on the same basis;
automatically enable or disable the channels at a pre-defined tracing time for each of those channels;
wherein the information extracted from the local media converter comprises at least one of:
one or more protocol identity codes and an operating mode associated with each respective protocol identity code;
one or more vendor identity codes, each of which is associated with a specific vendor; and
one or more unique log-in identity codes.

13. The local media converter of claim 12, wherein the processor is further configured to:
determine whether the information extracted from the local media converter comprises a protocol identity code that is associated with the protocol identity code included in information extracted from the locally-attached pluggable module, by correlating the respective protocol identity codes;
when a transmitter associated with the channel is disabled and the determination indicates the information extracted from the local media converter comprises a protocol identity code that is associated with the protocol identity code extracted from the locally-attached pluggable module, enable the channel by enabling the transmitter; and
when the transmitter associated with the channel is enabled and the determining indicates the information extracted via the local media converter comprises a protocol identity code that is not associated with the protocol identity code extracted from the locally-attached pluggable module, disable the channel by disabling the transmitter.

14. The local media converter of claim 12, wherein the processor is configured to extract, from the information extracted from the local media converter system, information on at least one operating mode pre-defined for the channel and an associated protocol identity code.

15. The local media converter of claim 14, wherein the processor is further configured to:
acquire the protocol identity code from the locally-attached pluggable module and to identify a protocol on the basis of the protocol identity code;
correlate the protocol identity code with operating modes and associated protocol identity codes comprised in the information extracted from the local media converter;
when a transmitter associated with the channel is disabled and the correlation indicates a match, enable the channel by enabling the transmitter; and
when the transmitter associated with the channel is enabled and the correlation does not indicate a match, disable the channel by disabling the transmitter.

16. The local media converter of claim 12, wherein the processor is further configured to:
extract a log-in identity code included in the information extracted from the locally-attached pluggable module, wherein the log-on identity code is a unique vendor specific code;
correlate the log-on identity code with log-on identity codes included in the information extracted from the local media converter; and
when the channel is enabled and the correlation does not indicate a match between the log-on identity code and one of the log-on identity codes included in the information extracted from the local media converter, disable the channel by disabling a transmitter associated with the channel.

17. The local media converter of claim 12, wherein the information extracted from the locally-attached pluggable module comprises an application identity code associated with the channel, and wherein the processor is further configured to:
extract a vendor identity code included in the application identity code, wherein the vendor identity code is indicative of the vendor of the locally-attached pluggable module;
correlate the vendor identity code with vendor identity codes included in the information extracted from the local media converter system; and
when the correlating does not indicate a match between the vendor identity code and one of the vendor identity codes included in the information extracted from the local media converter, disable the channel by disabling a transmitter associated with the channel.

18. The local media converter of claim 12, wherein the processor is further configured to update an alarm information list responsive to completion of the automatic enabling or disabling.

19. The local media converter of claim 12, wherein the processor is configured to extract the information from the local media converter by extracting the information from an identity coding library.

20. The local media converter of claim 12, wherein the local media converter is a 10GbE media converter.

21. The local media converter of claim 20, wherein the 10GbE media converter is configured to operate at any of:
   a limiting mode supporting one or more SFP+ 10GBase-SR/LR/ER type pluggable modules; and
   linear mode supporting one or more SFP+ 10GBased-LRM type pluggable modules.

22. The local media converter of claim 12, wherein the local media converter is a 1GbE media converter.

23. The local media converter of claim 22, wherein the 1GbE media converter is configured to operate at any of:
   a forced 1GbE bypass mode supporting one or more SFP 1000 Gbase-SX/LX10/LX40/ZX type pluggable modules; and
   an auto negotiation 1GbE bypass mode supporting a 1000 Base-T pluggable module.

24. A locally-attached pluggable module that is physically attachable to a local media converter, comprising:
   physical storage for storing module-specific information;
   an interface circuit configured to enable extraction of the module-specific information from the physical storage;
   wherein the module-specific information comprises at least one of:
      a protocol identity code corresponding to one of one or more protocol identity codes extractable from the local media converter;
      a vendor identity code corresponding to one of one or more vendor identity codes extractable from the local media converter; and
   a unique log-in identity code corresponding to one of one or more log-in codes extractable from the local media converter;
   wherein the local media converter is configured to:
      automatically enable or disable a channel of the local media converter based on a correlation between the module-specific information extracted from the locally-attached pluggable module and corresponding information extracted from the local media converter;
      automatically enable or disable one or more additional channels of the local media converter on the same basis;
      automatically enable or disable the channels at a predefined tracing time for each of those channels.

* * * * *

UNITED STATES PATENT AND TRADEMARK OFFICE
CERTIFICATE OF CORRECTION

Page 1 of 3

PATENT NO. : 8,788,722 B2
APPLICATION NO. : 13/379886
DATED : July 22, 2014
INVENTOR(S) : Huang It is certified that error appears in the above-identified patent and that said Letters Patent is hereby corrected as shown below:

On the Title Page, under "Assistant Examiner", in Column 2, Line 1, delete "Gentente A Yimer" and insert -- Getente A Yimer --, therefor.

In the Drawings

In Fig. 3, Sheet 2 of 10, for Tag "318", in Line 1, delete "EEPRPOM" and insert -- EEPROM --, therefor.

In Fig. 3, Sheet 2 of 10, for Tag "308", in Line 1, delete "PDM interface" and insert -- PMD interface --, therefor.

In Fig. 3, Sheet 2 of 10, for Tag "317", in Line 1, delete "I/O Expender" and insert -- I/O Expander --, therefor.

In Fig. 3, Sheet 2 of 10, for Tag "312", in Line 1, delete "EEPRPOM" and insert -- EEPROM --, therefor.

In Fig. 4, Sheet 3 of 10, delete "2 wire adress" and insert -- 2 wire address --, therefor.

In Fig. 12, Sheet 10 of 10, for Tag "1206", in Line 2, delete "infomation list" and insert -- information list --, therefor.

In the Specification

In Column 2, Line 10, delete "SW," and insert -- SFF, --, therefor.

In Column 2, Line 15, delete "SW-8472," and insert -- SFF-8472, --, therefor.

In Column 5, Line 31, delete "one of" and insert -- one of: --, therefor.

Signed and Sealed this
Fifteenth Day of December, 2015

Michelle K. Lee
*Director of the United States Patent and Trademark Office*

CERTIFICATE OF CORRECTION (continued)

U.S. Pat. No. 8,788,722 B2

In Column 5, Line 35, delete "login" and insert -- log-in --, therefor.

In Column 6, Lines 30-31, delete "embodiment" and insert -- embodiment. --, therefor.

In Column 7, Line 15, delete "that even" and insert -- that, even --, therefor.

In Column 8, Line 28, delete "100 in" and insert -- 100 m. --, therefor.

In Column 8, Line 52, delete "I/O Expender" and insert -- I/O Expander --, therefor.

In Column 8, Line 61, delete "ZSC interface" and insert -- ISC interface --, therefor.

In Column 9, Line 12, delete "8B/10B FCS," and insert -- 8B/10B PCS, --, therefor.

In Column 9, Line 15, delete "XAUI-IX" and insert -- XAUI-TX --, therefor.

In Column 9, Line 22, delete "XAUI IX" and insert -- XAUI TX --, therefor.

In Column 9, Line 25, delete "component," and insert -- components, --, therefor.

In Column 9, Line 32, delete "component" and insert -- components --, therefor.

In Column 9, Line 42, delete "XGXS FCS" and insert -- XGXS PCS --, therefor.

In Column 9, Line 44, delete "XAUI IX" and insert -- XAUI TX --, therefor.

In Column 9, Line 46, delete "PMD/PMA FCS" and insert -- PMD/PMA PCS --, therefor.

In Column 9, Line 55, delete "unit, such" and insert -- units, such --, therefor.

In Column 9, Line 62, delete "Input/Out" and insert -- Input/Output --, therefor.

In Column 10, Line 21, delete "support" and insert -- supports --, therefor.

In Column 11, Line 10, delete "PMD, FCS" and insert -- PMD, PCS --, therefor.

In Column 11, Line 16, delete "that for" and insert -- that, for --, therefor.

In Column 11, Line 43, delete "that if" and insert -- that, if --, therefor.

In Column 12, Line 10, delete "SW" and insert -- SFF --, therefor.

In Column 12, Line 24, delete "constant" and insert -- constants --, therefor.

In Column 13, Line 30, delete "$t_1$=10GBASESR," and insert -- $t_1$=10GBASE-SR, --, therefor.

In Column 13, Line 32, delete "$t_7$=1000BASE-LX40," and insert -- $t_7$=1000BASE-IX40, --, therefor.

In Column 15, Line 10, delete "XAUI-IX" and insert -- XAUI-TX, --, therefor.